United States Patent

Ticktin et al.

[11] Patent Number: 6,022,915
[45] Date of Patent: Feb. 8, 2000

[54] THERMOPLASTIC MOLDING COMPOUNDS AND A METHOD OF REDUCING THE FORMATION OF RESIDUAL MONOMERS IN THESE MOLDING COMPOUNDS

[75] Inventors: Anton Ticktin, Mannheim; Graham Edmund Mc Kee, Neustadt; Wolfgang Fischer, Ludwigshafen, all of Germany; Binnur Gunesin, Neuchatel, Switzerland; Norbert Güntherberg, Speyer, Germany

[73] Assignee: BASF Aktiengesellschaft, Ludwigshafen, Germany

[21] Appl. No.: 08/981,688

[22] PCT Filed: Jul. 2, 1996

[86] PCT No.: PCT/EP96/02896

§ 371 Date: May 12, 1998

§ 102(e) Date: May 12, 1998

[87] PCT Pub. No.: WO97/02314

PCT Pub. Date: Jan. 23, 1997

[30] Foreign Application Priority Data

Jul. 3, 1995 [DE] Germany .......................... 195 24 178

[51] Int. Cl.⁷ ..................................................... C08K 5/15
[52] U.S. Cl. ............................................................ 524/110
[58] Field of Search ............................................. 524/110

[56] References Cited

U.S. PATENT DOCUMENTS

| 4,806,580 | 2/1989 | Bock et al. | |
| 5,629,363 | 5/1997 | Abber | 523/161 |
| 5,747,162 | 5/1998 | Temple | 428/395 |
| 5,747,568 | 5/1998 | Fischer | 524/110 |

FOREIGN PATENT DOCUMENTS

| 263 524 | 4/1988 | European Pat. Off. . |
| 384 472 | 8/1990 | European Pat. Off. . |
| 44 05 670 | 8/1995 | Germany . |
| 90/07547 | 7/1990 | WIPO . |

OTHER PUBLICATIONS

Derwent Abst. J5 6028–228.
Derwent Abst J5 0110–442.
Abst. J5 4055–043.
Derwent Abst. J6 3137–941.
Derwent Abst. J5 8002–337.
Abst. J5 7002–337.

*Primary Examiner*—Paul R. Michl
*Attorney, Agent, or Firm*—Keil & Weinkauf

[57] ABSTRACT

The invention relates to thermoplastic molding compositions consisting of

A) 98–99.995% by weight, based on A+B, of at least one acrylonitrile-containing polymer, and
B) 0.005–2% by weight, based on A+B, of α-tocopherol.

The invention also relates to a method for reducing the formation of residual monomers on thermal stress and shearing of the thermoplastic molding compositions by adding α-tocopherol.

8 Claims, No Drawings

THERMOPLASTIC MOLDING COMPOUNDS AND A METHOD OF REDUCING THE FORMATION OF RESIDUAL MONOMERS IN THESE MOLDING COMPOUNDS

The invention relates to thermoplastic molding compositions and, in particular, to a method for reducing the formation of residual monomers on thermal stress and shearing of the molding compositions. WO 90/07547 discloses stabilizer mixtures of α-tocopherol (vitamin E) and glycerol mono-, di- and/or triesters of saturated or unsaturated fatty acids for stabilizing thermoplastics such as polyvinyl chloride, styrene polymers, polyamides, polycarbonate, polyesters and polyolefins. J5 6028-228 and J5 0110-442 describe the stabilization of, inter alia, polyethylene, polypropylene and PVC with α-tocopherol. J5 4055-043 and J6 3137-941-A mention as stabilizer for polyolefins vitamin E and a compound of the phosphite or phosphonite type. Furthermore, J5 8002-337 discloses a method for preventing the formation of carcinogenic nitrosamines in natural or synthetic rubber by incorporating vitamin E, inter alia, into the latter.

EP-A-0 384 472 discloses a composition comprising a thermoplastic, a light stabilizer and vitamin E as packing material for light-sensitive materials, and ABS is one of the thermoplastics mentioned.

Acrylonitrile-containing polymers are prone, especially on thermal stress or shearing, to form acrylonitrile monomers. This is a problem because acrylonitrile is classified as a group IIIA2 carcinogen (cf. acrylonitrile, data sheet M 016, 11/90, published by the Berufsgenossenschaft der Chemischen Industrie).

It was therefore the object of the present invention to develop molding compositions of acrylonitrile-containing polymers with which the formation of residual monomers on thermal stress and shearing is reduced. It has been found, surprisingly, that this technical problem can be solved by a thermoplastic molding composition of acrylonitrile-containing polymers and α-tocopherol. It has been found in particular that the formation of residual monomers can be reduced when acrylonitrile-containing polymers are subjected to thermal stress in the presence of α-tocopherol.

The present invention thus relates to thermoplastic molding compositions comprising A) 98–99.995% by weight, based on A+B, of at least one acrylonitrile-containing polymer, and B) 0.005–2% by weight, based on A+B, of α-tocopherol with or without C) conventional additives in effective amounts.

The invention furthermore relates to a method for reducing the formation of residual monomers on thermal stress and shearing of the molding compositions, which comprises adding 0.005–2% by weight, based on A+B, of α-tocopherol before, during or after the polymerization, but before the thermal stress or shearing. The invention furthermore relates to the use of the molding compositions according to the invention for producing moldings and to these moldings. The subject-matter of the invention and preferred embodiments thereof are defined in the claims. Component A comprises an acrylonitrile-containing polymer, preferably polyacrylonitrile, an acrylonitrile-styrene copolymer or a copolymer of acrylonitrile/styrene derivatives or of acrylonitrile and methyl methacrylate. Examples of suitable styrene derivatives are nuclear-substituted styrenes and styrenes substituted on the double bond, such as, for example, α-methylstyrene. An α-methylstyrene/acrylonitrile copolymer is most preferred.

In a preferred embodiment, the acrylonitrile-containing polymers contain other polymers such as, for example, rubbers such as polybutadiene or poly(butyl acrylates), which can also be grafted with other monomers, eg. with polystyrene/acrylonitrile. The acrylonitrile-containing polymers may also be mixed with polycarbonate.

The molding compositions according to the invention comprise 98–99.995, preferably 98.5–99.9, particularly preferably 99.5–99.93, in each case % by weight based on A+B, of the acrylonitrile-containing polymer.

α-Tocopherol is used as component B.

The amount of component B is 0.005–2, preferably 0.01–1.5, particularly preferably 0.02–0.5, in each case in % by weight based on A+B. In a preferred embodiment, component B is added before or during the preparation of the acrylonitrile-containing polymer. In another preferred embodiment, component B is added after the polymerization to the acrylonitrile-containing polymers or the molding compositions according to the invention before the thermal stress and shearing so that the thermal stress and shearing takes place in the presence of component B. In the latter case, the addition of component B to the polymer can take place by admixture to the polymer melt, eg. in an extruder.

The molding compositions according to the invention can contain as component C additives which are conventional for acrylonitrile-containing polymers. Suitable additives of this type are stabilizers such as, for example, sterically hindered phenols, phosphorus compounds and light stabilizers. Besides these, additives such as glass fibers, color, lubricants, carbon black and fillers may furthermore be present. The additives are used in conventional amounts, preferably in amounts of from 0.1 up to a total of 30% by weight, based on A+B.

The present invention has the advantage, besides the suppressing of the formation of acrylonitrile monomers and other monomers, that the use of α-tocopherol also leads to a considerably paler-colored product.

The molding compositions according to the invention are suitable for the production of moldings, especially in electrical engineering, for household products, in the hygiene sector and for manufacturing toys. Use in the automobile industry is also possible and advantageous.

The invention is illustrated by means of the following examples which represent preferred embodiments of the invention.

In the following tests, the residual monomer contents of the polymers were determined in 1,4-dioxane as solvent with a Hewlett Packard 5890 gas chromatograph with a DB wax capillary column (Ultra 20 column). The retention times and the GC factors of the flame ionization detector were calibrated using calibration solutions in 1,4-dioxane. The lower determination limit was 0.5 to 2.0 ppm.

The residual monomer contents of the polymer compositions of the following Examples 1 to 9 are shown in the table hereinafter.

I. Addition of α-tocopherol before the polymerization

EXAMPLE 1 (comparative)

57.8 parts by weight of α-methylstyrene and 34.0 parts by weight of acrylonitrile were polymerized with 0.076 part by weight of azobisisobutyronitrile in 8.2 parts by weight of ethylbenzene at 110° C. At 51% conversion, the polymer was degassed in an extruder, forced out as extrudate and then granulated. The maximum temperature during this is process was 250° C.

EXAMPLE 2 (invention)

Test 1 was repeated but 0.05% by weight of α-tocopherol, based on α-tocopherol and the monomers α-methylstyrene and acrylonitrile, was added to the reaction mixture before the polymerization started.

II. Addition of α-toconherol to the polymers

EXAMPLE 3 (comparative)

An α-methylstyrene/acrylonitrile (70:30) copolymer with a viscosity number of 56 ml/g (measured as 0.5% strength solution in DMF at 23° C.) was extruded in a Haake twin-screw extruder at 260° C. and 140 rpm. The throughput was 1 kg/h.

EXAMPLE 4 (comparative)

Test 3 was repeated but the copolymer was mixed with 0.1 % by weight, based on copolymer+stabilizer, of Irganox 1010 stabilizer (from Ciba Geigy), a conventional stabilizer for thermoplasts, before the extrusion.

EXAMPLE 5 (invention)

Test 4 was repeated but 0.05% by weight of α-tocopherol, based on copolymer+α-tocopherol, was added in place of Irganox 1010.

EXAMPLE 6 (comparative)

Example 3 was repeated but the temperature in the extruder was 300° C. instead of 260° C.

EXAMPLE 7 (invention)

Example 6 was repeated but the copolymer was mixed with 0.05% by weight of α-tocopherol, based on copolymer+α-tocopherol, before the extrusion.

EXAMPLE 8 (comparative)

An ABS polymer comprising 29 parts by weight of polybutadiene graft rubber prepared as disclosed in EP-A-062 901, and 71 parts by weight of a polystyrene/acrylonitrile copolymer with 35% by weight of acrylonitrile and a viscosity number of 80 ml/g (measured as 0.5% strength solution in DMF at 23° C.) was extruded in a ZSK 30 extruder from Werner and Pfleiderer at 100 rpm and 260° C. The throughput was 10 kg/h.

EXAMPLE 9 (invention)

Example 8 was repeated but the copolymer was mixed with 0.05% by weight of α-tocopherol, based on copolymer+α-tocopherol, before the extrusion.

TABLE

| Ex. No. | Polymer | Extrusion temperature | Stabiliser, % by weight based on copolymer + stabilizer | Residual monomer, ppm | | |
|---|---|---|---|---|---|---|
| | | | | AN | St | α-Me-St |
| 1* | AN-α-Me-St | 250° C. | 0.0 | 240 | — | 1270 |
| 2** | AN-α-Me-St | 250° C. | 0.05 α-tocopherol | 195 | — | 1200 |
| 3* | AN-α-Me-St | 260° C. | 0.0 | 910 | — | 4410 |
| 4* | AN-α-Me-St | 260° C. | 0.1 Irganox 1010 | 455 | — | 2915 |
| 5** | AN-α-Me-St | 260° C. | 0.1 α-tocopherol | 310 | — | 2220 |
| 6* | AN-α-Me-St | 300° C. | 0.0 | 1410 | — | 6410 |
| 7** | AN-α-Me-St | 300° C. | 0.05 α-tocopherol | 1050 | — | 5165 |
| 8* | ABS type | 260° C. | 0.0 | 22 | 215 | — |
| 9** | ABS type | 260° C. | 0.05 α-tocopherol | 17 | 150 | — |

*Comparative test
**Invention
AN: acrylonitrile
St: styrene
α-Me-St: α-methylstyrene It is evident from the Table that in the tests according to the invention, in which α-tocopherol was added to the acrylonitrile-containing polymer before the polymerization or to the polymer, a smaller content of residual monomers was measured on thermal stress than in the comparative tests in which either no stabilizer or a commercial stabilizer (Irganox 1010) was added. Thus addition of α-tocopherol suppresses the formation of residual monomers on thermal stress of the polymer.

We claim:

1. A method for reducing the formation of residual monomers on thermal stress and shearing of molding compositions containing as essential components
   A) 98–99.995% by weight, based on A+B, of at least one acrylonitrile-containing polymer, and
   B) 0.005–2% by weight, based on A+B, of α-tocopherol with or without
   C) conventional additives in effective amounts, which does not contain light-shielding components and amines,
   which method comprises adding 0.005–2% by weight, based on A+B, of α-tocopherol before, during or after the polymerization of the acrylonitrile-containing polymers and before the thermal stress and shearing of the molding compositions, and thereafter subjecting the molding compositions to thermal stress and shearing.

2. A method as defined in claim 2, wherein the acrylonitrile-containing polymer is polyacrylonitrile, an acrylonitrile/styrene copolymer, a copolymer of acrylonitrile/styrene derivatives, preferably nuclear-substituted styrenes or styrenes substituted on the double bond, or a copolymer of acrylonitrile and methyl methacrylat.

3. A method as defined in claim 1, wherein the acrylonitrile-containing polymer is an α-methylstyrene/acrylonitrile copolymer.

4. A molding made from the molding compositions as claimed in claim 2.

5. A method as defined in claim 1, wherein α-tocopherol is added during or after the polymerization of the acrylonitrile-containing polymers.

6. A method as defined in claim 1, wherein the α-tocopherol is added after the polymerization of the acrylonitrile-containing polymers.

7. A method as defined in claim 1 wherein the thermal stress and shearing are caused by extrusion.

8. A method as defined in claim 7 wherein the extrusion is by screw extrusion.

* * * * *